US010494291B2

(12) United States Patent
Dawes et al.

(10) Patent No.: US 10,494,291 B2
(45) Date of Patent: Dec. 3, 2019

(54) HYGROSCOPIC ADDITIVES FOR SILICA SOOT COMPACTS AND METHODS FOR FORMING OPTICAL QUALITY GLASS

(71) Applicant: CORNING INCORPORATED, Corning, NY (US)

(72) Inventors: Steven Bruce Dawes, Corning, NY (US); Lisa Ann Hogue, Corning, NY (US)

(73) Assignee: CORNING INCORPORATED, Corning, NY (US)

(*) Notice: Subject to any disclaimer, the term of this patent is extended or adjusted under 35 U.S.C. 154(b) by 99 days.

(21) Appl. No.: 14/878,298

(22) Filed: Oct. 8, 2015

(65) Prior Publication Data
US 2016/0115070 A1   Apr. 28, 2016

Related U.S. Application Data

(60) Provisional application No. 62/067,625, filed on Oct. 23, 2014.

(51) Int. Cl.
*C03B 19/06* (2006.01)
*C03B 37/012* (2006.01)

(52) U.S. Cl.
CPC ...... *C03B 37/01282* (2013.01); *C03B 19/066* (2013.01)

(58) Field of Classification Search
CPC .......................... C03B 37/01282; C03B 19/06
See application file for complete search history.

(56) References Cited

U.S. PATENT DOCUMENTS

| | | | | |
|---|---|---|---|---|
| 3,177,057 A | * | 4/1965 | Potter | C03B 37/00 106/313 |
| 3,686,006 A | * | 8/1972 | Horton | B22C 1/20 106/38.3 |
| 4,364,883 A | * | 12/1982 | Shannon | C04B 33/36 264/333 |
| 4,501,601 A | | 2/1985 | Haupt | |
| 4,569,920 A | * | 2/1986 | Smith-Johannsen | C04B 30/00 106/287.1 |
| 4,620,862 A | | 11/1986 | Dorn et al. | |
| 4,867,774 A | | 9/1989 | Dorn | |
| 5,185,020 A | | 2/1993 | Satoh et al. | |
| 5,215,564 A | | 6/1993 | Weber | |

(Continued)

FOREIGN PATENT DOCUMENTS

EP      0127956 A1    12/1984
EP      0652184 A1     5/1995

(Continued)

OTHER PUBLICATIONS

Yoshida, Satoh, Enomoto; Yagi; Hihara; Oku; "Fracture Origins of Optical Fibers Fabricated by Hybridized Process" Journal of Lightwave Technology; vol. 14; No. 11; Nov. 1996, pp. 2506-2512.

(Continued)

*Primary Examiner* — John M Hoffmann

(57) ABSTRACT

A method for forming an optical quality glass is provided. The method includes contacting silica soot particles with a hygroscopic additive, forming a silica soot compact, and removing the hygroscopic additive from the silica soot compact. A method of forming a cladding portion of an optical fiber preform is also provided.

11 Claims, 1 Drawing Sheet

(56) References Cited

U.S. PATENT DOCUMENTS

| | | | |
|---|---|---|---|
| 5,236,481 A | | 8/1993 | Berkey |
| 5,240,488 A | * | 8/1993 | Chandross .............. C03B 19/12 |
| | | | 501/12 |
| 5,244,485 A | | 9/1993 | Hihara et al. |
| 5,261,938 A | | 11/1993 | Kitamura et al. |
| 5,314,520 A | | 5/1994 | Yagi et al. |
| 5,318,432 A | | 6/1994 | Yagi et al. |
| 5,352,259 A | | 10/1994 | Oku et al. |
| 5,562,752 A | * | 10/1996 | Fleming, Jr. .......... C03B 37/016 |
| | | | 423/338 |
| 5,711,215 A | | 1/1998 | Sextl et al. |
| 5,885,493 A | * | 3/1999 | Janney ................. C04B 35/622 |
| | | | 264/232 |
| 5,922,272 A | * | 7/1999 | Sambrook ............. C04B 35/111 |
| | | | 264/109 |
| 6,223,563 B1 | * | 5/2001 | Bahr, Jr. ................ C03B 19/12 |
| | | | 264/621 |
| 6,340,650 B1 | * | 1/2002 | Haun ..................... C03B 19/06 |
| | | | 501/155 |
| 7,140,202 B2 | * | 11/2006 | Freund .................... C03B 19/12 |
| | | | 501/12 |
| 7,384,470 B2 | | 6/2008 | Binkle et al. |
| 7,452,518 B2 | * | 11/2008 | Hansen .................. C01B 33/18 |
| | | | 423/325 |
| 7,476,474 B2 | | 1/2009 | Ganguli et al. |
| 7,647,792 B2 | | 1/2010 | Ichii et al. |
| 8,578,736 B2 | | 11/2013 | Dawes et al. |
| 8,869,566 B2 | | 10/2014 | Allen et al. |
| 8,904,828 B2 | | 12/2014 | Dawes et al. |
| 8,948,749 B2 | | 2/2015 | Deshpande et al. |
| 2002/0157418 A1 | * | 10/2002 | Ganguli ................. C03B 19/12 |
| | | | 65/17.2 |
| 2002/0192366 A1 | * | 12/2002 | Cramer ................ C03C 17/245 |
| | | | 427/162 |
| 2005/0220692 A1 | | 10/2005 | Mangold et al. |
| 2006/0115913 A1 | | 6/2006 | Orita et al. |
| 2008/0285930 A1 | | 11/2008 | Gasca et al. |
| 2010/0071421 A1 | | 3/2010 | Dawes et al. |
| 2010/0107700 A1 | | 5/2010 | Dawes et al. |
| 2011/0033694 A1 | * | 2/2011 | Jing ...................... C03C 17/007 |
| | | | 428/331 |
| 2011/0100063 A1 | | 5/2011 | Desorcie et al. |
| 2012/0047959 A1 | | 3/2012 | Allen et al. |
| 2012/0100373 A1 | * | 4/2012 | Shinbach ................ B02C 23/06 |
| | | | 428/402 |
| 2013/0045854 A1 | * | 2/2013 | Coapes ............... C03B 19/1415 |
| | | | 501/53 |
| 2014/0363670 A1 | | 12/2014 | Bookbinder et al. |

FOREIGN PATENT DOCUMENTS

| | | | |
|---|---|---|---|
| JP | 59019891 | A | 5/1984 |
| JP | 61256937 | A | 11/1986 |
| JP | 62027341 | A | 2/1987 |
| JP | 63055132 | A | 3/1988 |
| JP | 04325430 | | 11/1992 |
| JP | 05294658 | A | 11/1993 |
| JP | 05294659 | A | 11/1993 |
| JP | 05345628 | A | 12/1993 |
| JP | 6048758 | A | 2/1994 |
| JP | 06080436 | A | 3/1994 |
| JP | 2007230814 | A | 9/2007 |
| JP | 2008266087 | | 11/2008 |

OTHER PUBLICATIONS

Dorn, "0.27-dB/km Attenuation Achieved by MSP Preform Process" Journal of Lightwave Technology; vol. 9; No. 6; Jun. 1991; pp. 709-714.

Dorn, "Mechanically Shaped Preforms for Optical Fiber Production" 1225 Electrical Communication; vol. 59; No. 4; 1985; pp. 396-400.

Yoshida, Satoh, Enomoto; Yagi; Hihara; Oku; "Hybridised Fabrication Process for Optical Fibres" Electronics Letters; vol. 32; No. 3; Feb. 1996; p. 242.

Clasen, "Preparation and Sintering of High-Density Green Bodies to High-Purity Silica Glasses" Journal of Non Crystalline Solids; vol. 89; 1987; pp. 335-344.

Yoshida, Satoh, Enomoto; Yagi; Hihara; Oku; "Fabrication of large performs for low-loss single-mode optical fibers by a hybridized process" Glastech Berichte Glass Sci. Techno, 69 (12) 1996 p. 412-416.

European Patent Office, Notification of Transmittal of the International Search Report and the Written Opinion of the International Searching Authority re: International Application No. PCT/US2015/056569, dated Jan. 19, 2016, 1 Page.

European Patent Office, The International Search Report re: International Application No. PCT/US2015/056569, dated Jan. 19, 2016, 6 Pages.

European Patent Office, The Written Opinion of the International Searching Authority re: International Application No. PCT/US2015/056569, dated Jan. 19, 2016, 8 Pages.

* cited by examiner

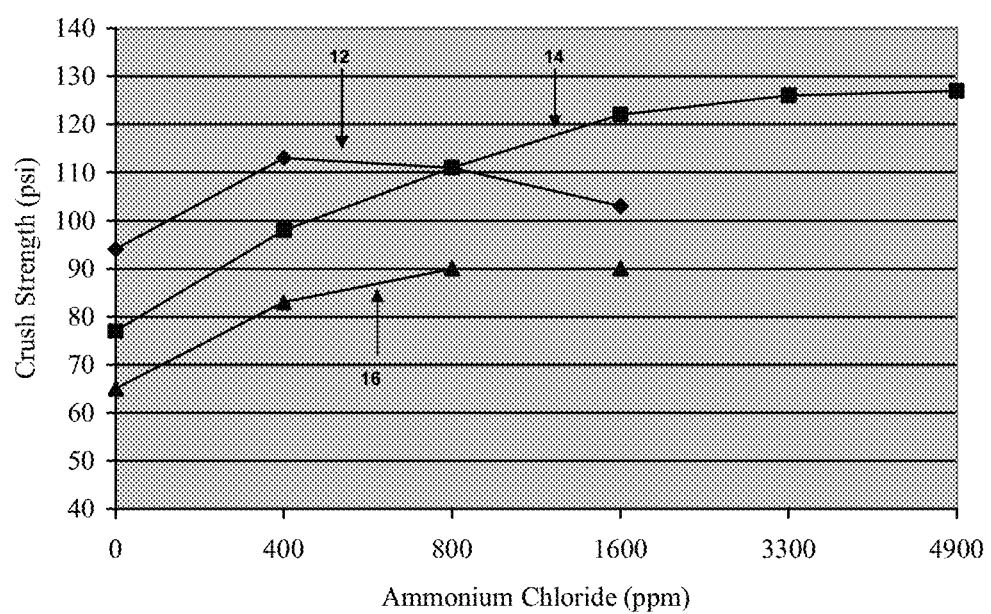

HYGROSCOPIC ADDITIVES FOR SILICA SOOT COMPACTS AND METHODS FOR FORMING OPTICAL QUALITY GLASS

This application claims the benefit of priority to U.S. Provisional Application No. 62/067,625 filed on Oct. 23, 2014 the content of which is incorporated herein by reference in its entirety.

FIELD

The present disclosure relates generally to methods for forming optical quality glass, and in particular, to methods for forming silica soot compacts.

BACKGROUND

Silica soot particles are a by-product of high purity fused silica glass making processes. For example, conventional chemical vapor deposition (CVD) processes for making optical fiber preforms, such as outside vapor deposition (OVD) and vapor axial deposition (VAD) processes, often utilize only a portion of the starting raw material due to limitations in the deposition efficiency of the processes. Use of the resulting "waste" silica soot in forming optical quality glass could, therefore, potentially result in significant raw material cost savings.

Accordingly, different methods have been devised to utilize otherwise unutilized silica soot in the production of optical quality glass. These methods, which include, for example, sol-gel (and other "wet") processes, can suffer from a variety of drawbacks including expensive, complicated, and/or time consuming processing conditions and equipment, and may result in soot compacts with less than desirable properties such as unacceptable variability with respect to compact density and geometry. These less than desirable properties adversely affect compact strength and can result in cracking, breaking or other types of soot compact failure.

According to one method, soot compact strength may be improved by increasing the water content in a silica soot sample. However, as water is volatile, and can be difficult to distribute throughout the silica soot sample, even an initially well distributed water supply is subject to drying and loss of cohesive strength over time. As a result of compaction that occurs as the meniscus force of the drying draws particles together, agglomerates that retain high density in the silica soot are formed. These agglomerates adversely affect soot compact strength and may lead to the formation of pores in the resultant glass.

Organic additives may also be effective in strengthening soot compacts. However, removal of organic additives from high purity silica soot can be difficult to achieve and may necessitate additional high temperature processing steps. If unsuccessfully removed, the organic additives may become trapped in the silica soot through consolidation and may form pores in the resultant glass. Still other additives that may improve soot compact strength require a high temperature active oxidation or chlorination to be removed from the silica soot. At the temperatures required for removal, these additives may interact with the silica surface of the silica soot and initiate irreversible crystallization.

SUMMARY

According to an embodiment of the present disclosure, a method for forming an optical quality glass is provided. The method includes contacting silica soot particles with a hygroscopic additive, forming a silica soot compact, and removing the hygroscopic additive from the silica soot compact.

According to another embodiment of the present disclosure, a method of forming a cladding portion of an optical fiber preform is provided. The method includes positioning a partially manufactured optical fiber preform in an inner cavity of a mold body. The method further includes contacting silica soot particles with a hygroscopic additive, and, after contacting the silica soot particles with the hygroscopic additive, loading the mold body with the silica soot particles. The method further includes compressing the silica soot particles in a radial direction to form a silica soot compact, and removing the hygroscopic additive from the silica soot compact.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which:

FIG. 1 is a graph depicting crush strength test results for pellets produced in embodiments of accordance with the present disclosure.

DETAILED DESCRIPTION

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

According to an embodiment of the present disclosure, a method for forming an optical quality glass is provided. The method includes contacting silica soot particles with a hygroscopic additive, forming a silica soot compact, and removing the hygroscopic additive from the silica soot compact. As described herein, the term silica soot particles refers to amorphous soot particulate material made of silica or silica doped with dopants such as, but not limited to, germania, phosphorus, fluorine, titania, chlorine, and so forth. The silica soot particles may have a size of between about 0.05 micron and about 0.4 micron with an average particle size of about 0.2 micron. The particulate surface area of the silica-based soot particles may be greater than about 15 m²/g, more preferably greater than about 17 m²/g, even more preferably greater than about 20 m²/g, and even greater than about 50 m²/g. The particulate surface areas may be as high as about 250 m²/g or more.

Embodiments of the present disclosure include contacting pure silica soot particles with a hygroscopic additive. The hygroscopic additive may be chosen to provide increased strength to the resulting soot compacts, which in turn reduces compact failure resulting from handling and processing of the soot compacts. The hygroscopic additive may also be chosen to prevent contamination of the soot compact and the resultant glass produced from the soot compact. Furthermore, the hygroscopic additive may be chosen based on ease of removal. In other terms, the hygroscopic additive may be removed from the soot compact without requiring additional high temperature process steps.

The hygroscopic additive may be an ionic compound such as an ammonium salt. Applicable additives include, but are not limited to, ammonium chloride, ammonium bromide, ammonium carbonate, ammonium bicarbonate, ammonium acetate, and ammonium thiocyanate.

Unless otherwise specially noted, the term "ppm" as used herein generally refers to parts per million based on weight, and a measurement in wt % can be converted to ppm by multiplying by a factor of 10,000.

The hygroscopic additive may be added to the silica soot particles in concentrations of between about 1 ppm and about 4900 ppm, or between about 1 ppm and about 3300 ppm. Alternatively, the hygroscopic additive may be added in concentrations of between about 400 ppm and about 1600 ppm.

The hygroscopic additive may be added at any time prior to the formation the silica soot compact. For example, the additive may be added while the silica soot particles are being collected, after the silica soot particles have been collected, or while the silica soot particles are being prepared for formation of the silica soot compact. The additive may be added to the silica soot particles in discrete crystal form, such as by being brought into physical contact with the silica soot particles in the absence of a solvent. The additive may be distributed as a solute in a moisture layer on the silica soot particles. The additive may be brought into contact with silica soot particles by being injection or dry sprayed onto the silica soot particles during, for example, a collection step of a silica soot generation process or a collection step of a CVD process. Alternatively, a slurry including silica soot particles, a hygroscopic additive, and a solvent such as an alcohol, may be formed to contact the silica soot particles with the hygroscopic additive.

Other than a moisture layer that may be present on the surface of the silica soot particles, the methods disclosed herein are preferably water-free. By water-free, it is meant that the methods do not include adding water.

Once the hygroscopic additive is added, heat may be applied to facilitate additional distribution of the additive on the silica soot particles. According to an embodiment of the present disclosure, the silica soot particles containing the hygroscopic additive may be heated to a temperature of less than about 250° C. In yet another embodiment, the silica soot particles containing the hygroscopic additive may be heated to a temperature of between about 100° C. and about 200° C. In embodiments where the hygroscopic additive is added while the silica soot particles are collected in, for example, a collection step of a silica soot generation process or a collection step of a CVD process, it is believed that the collection conditions may provide the heat necessary to facilitate additional distribution of the additive on the silica soot particles.

The silica soot particles disclosed herein may serve as precursors to optical quality glass. The silica soot particles may be pressed over the outer layer of a substrate to form at least a portion of an optical fiber preform to form a cladding portion of the optical fiber preform. For example, a method for forming an optical fiber preform may include placing a partially manufactured consolidated or unconsolidated silica glass preform into an inner cavity of a mold body. The partially manufactured preform may include a soot region deposited via chemical vapor deposition processes such as OVD or VAD. Silica soot particles may then be deposited into the inner cavity between the partially manufactured preform and an inner wall of the mold body, and a radially inward pressure may be applied against the particulate glass material to pressurize the particulate glass material against the soot region on the partially manufactured preform. Pressing methods and apparatuses disclosed in U.S. Pat. No. 8,578,736 and U.S. Publication No. 2010/0107700, the specifications of which are incorporated by reference in their entirety, may be employed.

The hygroscopic additive may be removed from the silica soot compact. For example, the hygroscopic additive may be removed from the silica soot compact once all processing steps that require increased strength have been completed. Processing steps that require increased strength may be, but are not limited to, lifting the silica soot compact from a mold, transporting the compact from one position to another, mounting the compact on a transport device and placing the compact into a heated furnace. Removing the hygroscopic additive may include heating the silica soot compact to induce a controlled vaporization of the hygroscopic additive, which may also achieve a residue free removal. By inducing a controlled vaporization, it is meant that the hygroscopic additive is removed at a rate that produces minimal internal pressure to the silica soot compact and that avoids formation of internal fractures in the silica soot compact. The hygroscopic additive may be removed by heating the silica soot compact to a temperature above about 200° C. at a rate of less than about 10° C. per minute. The silica soot compact may be heated to a temperature above about 200° C. at a rate of about 1° C. to about 5° C. per minute. Heating of the silica soot compact may be done in air or nitrogen-rich atmospheres.

The silica soot compact may be also be aged to increase the strength of the silica soot compact. The silica soot compact may be aged for about 24 hours. Alternatively, the silica soot compact may be aged for more than about 24 hours, for example, for more than about 48 hours, or even for more than about 72 hours. Aging of at least about 24 hours may increase the strength of the silica soot compact by more than about 15% as compared to a silica soot compact that is not aged.

EXAMPLES

Embodiments of the present disclosure are further described below with respect to certain exemplary and specific embodiments thereof, which are illustrative only and not intended to be limiting.

Example 1

Silica soot particles having a particle size of between about 0.05 micron and about 0.4 micron were mixed with a solution of ammonium chloride to form a slurry which was then dried to a free flowing powder. Ammonium chloride was dissolved in about 20 cc of 200 proof ethanol and was added to the silica soot particles. For a total mass of 80 grams of silica soot particles, Table I provides the weight in grams of ammonium chloride added:

TABLE I

| $NH_4Cl$ (ppm) | grams $NH_4Cl$/80 grams silica soot |
|---|---|
| 400 | 0.0326 |
| 800 | 0.0652 |
| 1600 | 0.1304 |
| 2400 | 0.1956 |
| 3300 | 0.2608 |

Additional ethanol, up to about 60 cc, was added to create a free-flowing slurry. The slurry was manually stirred in a large surface area vessel, such as a 190 mm dia.×100 mm H crystallization dish, until homogeneous. After mixing, a nitrogen stream was applied to the slurry while stirring to evaporate the majority of ethanol. The silica soot was then placed in a 60° C. oven overnight to complete ethanol evaporation.

This process provides one way of contacting a hygroscopic additive with the silica soot particle surface; however, the silica soot may form agglomerates in the presence of water or alcohols. Agglomerates retain high density because of the compaction that occurs as the meniscus force of the drying draws particles together. This high density in turn can make it difficult to press the dried silica soot to form a silica soot compact.

Example 2

Dry silica soot particles having a particle size of between about 0.05 micron and about 0.4 micron were physically contacted with ammonium chloride particles in the absence of a solvent. The silica soot particles and the ammonium chloride particles were weighed out in proportions equal to those described in Table I, and were placed in a rolling container. The container was placed on a roller mill and was rolled for about 3.0 hours to contact the silica soot particles with the ammonium chloride. After the rolling was completed, the container was allowed to sit for between about 24 hours and about 72 hours.

Due to the high solubility of ammonium chloride in water, and the relatively rich water content found on silica surfaces, physically contacting the ammonium chloride with silica soot particles, in the absence of a solvent, for a sufficient period of time, allows the ammonium chloride to dissolve onto the surfaces of the silica soot particles.

Example 3

A sample of silica soot prepared according to the process discussed in Example 2 was aged for greater than one day and then heat treated at about 150° C. for about 2.0 hours in a closed vessel to create a vapor phase transport enhancement of the dispersion. The silica soot sample was cooled to room temperature before opening the vessel.

In a closed system, ammonia and hydrochloric acid gases can recombine on a cooler or lower energy surface. With the hydrated surface of the silica soot particles providing a lower energy surface for re-adsorbing and stabilizing ammonium chloride, the additional heating period may be employed to accelerate the adsorptive dispersion of the ammonium chloride.

Mechanical Testing

An MTS Insight Electromechanical Testing System (commercially available from MTS Systems Corporation, Eden Prairie, Minn.) was used to make pellets using silica soot treated according to the methods set forth in Examples 1-3, and then crush the pellets in a compression test. Sample sizes were made and tested in triplicate to avoid any sample height dependent effects, as well as to ensure reproducibility of the sample data. Baseline pellets were produced using pure silica soot absent any hygroscopic additive.

For each test, approximately 6.0 grams of treated silica soot were weighed and poured into a solid steel mold with an inner diameter of about 25.4 mm. The inside surface was polished, and snug fitting steel rams with a diameter of about 25.3 mm compacted the sample. Discs cut from laboratory weighing paper were used at ram/soot interfaces to prevent sticking. The pellet was compressed to a load of 400 pounds force at a down drive rate of 0.2 mm/sec., held for about 10 minutes, and released. The pellet was then extracted from the mold to be weighed, and the height of the pellet was measured to enable a calculation of pellet density. A compression test was then run at a down drive rate of 0.01 cm/min. The stress curve was observed in real time, and the test was manually aborted upon the observation of failure (past peak load).

FIG. 1 shows the results of strength tests for pellets produced using three separate silica soot samples. Ammonium chloride up to about 4900 ppm was added to each of the three silica soot samples in accordance with the process described in Example 1, and test pellets were produced therefrom. Baseline samples containing no added ammonium chloride were also used to produce test pellets. Sample 12 and sample 14 were collected from a specialty silica soot generation system and distinguished by a humidification process, where sample 14 was exposed to a water stream after collection and sample 12 was a dry sample. Sample 16 was a by-product of a CVD process and was collected from a particulate collection system equipped with reverse osmosis cooling water.

As shown in FIG. 1 and Table II, a general trend of increasing strength with increasing ammonium chloride content was observed for all samples up to at least about 1600 ppm. Particularly in the case of sample 14, increased strength of about 20-60% was observed. Pellets produced from sample 14 were observed to have the greatest strength.

TABLE II

| NH4Cl (ppm) | Sample 12 Strength (psi) | Sample 14 Strength (psi) | Sample 16 Strength (psi) |
|---|---|---|---|
| 0 | 94 | 77 | 65 |
| 400 | 113 | 98 | 83 |
| 800 | 111 | 111 | 90 |
| 1600 | 103 | 122 | 90 |
| 3300 | — | 126 | 80 |
| 4900 | — | 127 | — |

Some pellets were also aged for about 72 hours. Increased strength of up to about 15% was observed with the additional aging time. For example, a strength increase from about 103 psi to about 113 psi was observed with the additional aging time for sample 14 having ammonium chloride added at about 1600 ppm. Similarly, a strength increase from about 126 psi to about 144 psi was observed with the additional aging time for sample 14 having ammonium chloride added at about 3300 ppm.

Table III show the results of strength tests for pellets produced from silica soot samples treated in accordance with the processes described in Example 2 (PEL2) and Example 3 (PEL3). Table III also shows a comparison to the strength test results of the pellets produced from sample 14 as discussed above. About 1600 ppm ammonium chloride was added to the silica soot samples in accordance with the processes described in Examples 2 and 3, and test pellets were produced therefrom. Baseline samples containing no added ammonium chloride were also used to produce test pellets.

Baseline PEL2 strength was observed to be greater than the strength of any of the baseline pellets of sample 12, sample 14, or sample 16. As compared to baseline PEL2, the strength of PEL2 having ammonium chloride added at about 1600 ppm was observed to be greater (121 psi as compared to 109 psi). Some pellets were aged for about 24 hours, about 48 hours and about 72 hours prior to strength testing. After about 48 hours and about 72 hours, an increase in strength for PEL2 having ammonium chloride added at about 1600 ppm was observed (from about 121 psi to about 135 psi). This observed strength was also greater than the strength of sample 14 having ammonium chloride added at about 1600 ppm after an equivalent period of aging.

The strength of PEL3 having ammonium chloride added at about 1600 ppm was also tested and showed a greater strength than both of sample 14 and he PEL2 having ammonium chloride added at about 1600 ppm.

TABLE III

| NH4Cl (ppm) | Age (hours) | HUM Strength (psi) | PEL2 Strength (psi) | PEL3 Strength (psi) |
| --- | --- | --- | --- | --- |
| 0 | 0 | 77 | 109 | — |
| 1600 | 0 | 122 | — | 130 |
| 1600 | 24 | — | 121 | — |
| 1600 | 48 | — | 135 | — |
| 1600 | 72 | 124 | 135 | — |

Hygroscopic Additive Removal

A pellet produced using a silica soot sample having ammonium chloride added at about 1600 ppm, and treated in accordance with the process described above in Example 3, was tested for ammonium chloride decomposition characteristics. A 1.50 gram piece of material was positioned in a glass tube to which pure nitrogen was added. The tube was positioned in a furnace at about 235° C., and the temperature was ramped to about 500° C. at 5° C./minute. The nitrogen stream was directed into an FTIR System (commercially available from MKS Instruments, Andover, Mass.) for quantitative analysis of gas-off products. For approximately four minutes starting at about 270° C., equivalent signals of ammonia and hydrochloric acid evolved from the sample, which produced a signal amounting to about 125 ppm of ammonium chloride. The rapid decomposition of ammonium chloride is predicted by thermochemical properties, and shows that a residue free removal is achieved with heating to moderate temperatures (less than about 350° C.) in air or in nitrogen-rich atmospheres.

It should be noted that the transfer line from the furnace to the spectrometer was not heated and that recombination of the gases in the lines most likely accounts for the difference between the about 125 ppm of ammonium chloride observed during the heating process, and the about 1600 ppm of ammonium chloride that was added to the silica soot sample in Example 3.

It will be apparent to those skilled in the art that various modifications and variations can be made without departing from the spirit or scope of the invention.

What is claimed is:

1. A method of forming optical quality glass, the method comprising:
   spraying a hygroscopic additive onto silica soot particles to obtain a weight ratio of the hygroscopic additive to the silica soot particles of between about 400 ppm and about 1600 ppm;
   heating the silica soot particles and hygroscopic additive to a temperature of between about 100° C. and about 200° C.;
   after said heating the silica soot particles and hygroscopic additive to a temperature of between about 100° C. and about 200° C., forming a silica soot compact from the silica soot particles and the hygroscopic additive; and
   removing the hygroscopic additive from the silica soot compact by heating the silica soot compact to a temperature above about 200° C. at a rate of less than about 10° C. per minute.

2. The method of claim 1, wherein the hygroscopic additive comprises an ammonium salt.

3. The method of claim 2, wherein the ammonium salt is selected from the group consisting of ammonium chloride, ammonium bromide, ammonium carbonate, ammonium bicarbonate, ammonium acetate, and ammonium thiocyanate.

4. The method of claim 1, further comprising the step of:
   pressing the silica soot particles and the hygroscopic additive over an outer layer of a substrate to form at least a portion of an optical fiber preform.

5. The method of claim 1, wherein the heating the silica soot compact comprises heating the silica soot compact at a rate from about 1° C. per minute to about 5° C. per minute.

6. A method of forming a cladding portion of an optical fiber preform, the method comprising:
   positioning a partially manufactured optical fiber preform in an inner cavity of a mold body;
   contacting silica soot particles with a hygroscopic additive to obtain a weight ratio of the hygroscopic additive to the silica soot particles of between about 400 ppm and about 1600 ppm;
   heating the silica soot particles and hygroscopic additive to a temperature of between about 100° C. and about 200° C.;
   after contacting the silica soot particles with the hygroscopic additive and after said heating the silica soot particle and hygroscopic additive to a temperature of between about 100° C. and about 200° C., loading the mold body with the silica soot particles;
   compressing the silica soot particles and the hygroscopic additive in a radial direction to form a silica soot compact; and
   removing the hygroscopic additive from the silica soot compact by heating the silica soot compact to a temperature above about 200° C. at a rate from about 1° C. per minute to about 5° C. per minute.

7. The method of claim 6, wherein the hygroscopic additive comprises an ammonium salt.

8. The method of claim 7, wherein the ammonium salt is selected from the group consisting of ammonium chloride, ammonium bromide, ammonium carbonate, ammonium bicarbonate, ammonium acetate, and ammonium thiocyanate.

9. A method of forming optical quality glass, the method comprising:
  contacting silica soot particles with a hygroscopic additive to obtain a weight ratio of the hygroscopic additive to the silica soot particles of between about 400 ppm and about 1600 ppm;
  heating the silica soot particles and hygroscopic additive to a temperature of between about 100° C. and about 200° C.;
  after said heating the silica soot particles and hygroscopic additive to a temperature of between about 100° C. and about 200° C., forming a silica soot compact from the silica soot particles and the hygroscopic additive; and
  removing the hygroscopic additive from the silica soot compact by heating the silica soot compact to a temperature above about 200° C. at a rate from about 1° C. per minute to about 5° C. per minute.

10. The method of claim 9, wherein the hygroscopic additive comprises an ammonium salt.

11. The method of claim 10, wherein the ammonium salt is selected from the group consisting of ammonium chloride, ammonium bromide, ammonium carbonate, ammonium bicarbonate, ammonium acetate, and ammonium thiocyanate.

* * * * *